(12) United States Patent
Jahr (10) Patent No.: US 11,106,526 B1
(45) Date of Patent: Aug. 31, 2021

(54) ARCHITECTURE-BASED ROOT CAUSE ANALYSIS

(71) Applicant: SAP SE, Walldorf (DE)

(72) Inventor: Andreas Jahr, Karlsruhe (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/896,403

(22) Filed: Jun. 9, 2020

(51) Int. Cl.
*G06F 11/07* (2006.01)
*G06F 11/14* (2006.01)
*G06F 16/14* (2019.01)
*G06F 11/32* (2006.01)
*G06F 16/17* (2019.01)
*G06F 11/30* (2006.01)

(52) U.S. Cl.
CPC ........ *G06F 11/079* (2013.01); *G06F 11/1435* (2013.01); *G06F 11/302* (2013.01); *G06F 11/327* (2013.01); *G06F 16/148* (2019.01); *G06F 16/1734* (2019.01)

(58) Field of Classification Search
CPC .. G06F 11/079; G06F 11/1435; G06F 11/302; G06F 11/327
See application file for complete search history.

(56) References Cited

U.S. PATENT DOCUMENTS

| | | | |
|---|---|---|---|
| 9,715,422 B2* | 7/2017 | Kumar | G06F 11/362 |
| 10,031,815 B2* | 7/2018 | Cohen | G06F 11/3051 |
| 11,061,800 B2* | 7/2021 | Prakash | G06F 11/366 |

* cited by examiner

*Primary Examiner* — Nadeem Iqbal
(74) *Attorney, Agent, or Firm* — Fish & Richardson P.C.

(57) ABSTRACT

Methods, systems, and computer-readable storage media for receiving a first identifier associated with an incident arising in a first software system, transmitting a first query to an architecture metadata repository, receiving, from the architecture metadata repository, first architecture metadata at least partially including a first architecture graph that is a computer-readable data representation of the first software system and cross-link data representative of one or more dependencies between the first software system and a second software system, transmitting a second query to the architecture metadata repository, the second query including a second identifier assigned to the second software system, receiving second architecture metadata representative of the second software system, and displaying at least a portion of the first architecture metadata and at least a portion of the second architecture metadata in a display.

20 Claims, 7 Drawing Sheets

ARCHITECTURE-BASED ROOT CAUSE ANALYSIS

BACKGROUND

Enterprises can use software systems to support and execute operations. In many cases, enterprises can use hundreds to thousands of software systems across a landscape. In general, during development of a software system (also referred to as a product herein), architecture diagrams are created and are relevant in describing relationships between components of the software system. However, during subsequent lifecycle phases of the software system (e.g., operations and support), the architecture diagrams are without relevance. More particularly, while information contained in the architecture diagrams may be relevant, the architecture diagrams themselves are not. The lack of relevance in subsequent lifecycle phases, negatively impacts diagram accuracy and devalues the original resources and effort spent in creating the architecture diagrams.

Attempts have been made in an effort to enable consistent use of architecture diagrams. However, tools that have been developed have failed to use architecture diagrams consistently during the entire product development. This is due to their lack of flexibility and expensive demand for rigorous design accuracy and detail.

SUMMARY

Implementations of the present disclosure are directed to root cause analysis (RCA) of issues in software systems. More particularly, implementations of the present disclosure are directed to a RCA platform that enables architecture-based RCA.

In some implementations, actions include receiving, by a support system having architecture-based RCA integrated therein, a first identifier associated with an incident arising in a first software system executed within a computing environment, transmitting, by the support system, a first query to an architecture metadata repository, the first query including the first identifier, receiving, by the support system and from the architecture metadata repository, first architecture metadata at least partially including a first architecture graph that is a computer-readable data representation of the first software system and cross-link data representative of one or more dependencies between the first software system and a second software system, transmitting, by the support system, a second query to the architecture metadata repository, the second query including a second identifier assigned to the second software system, the second identifier provided from the cross-link data, receiving, by the support system and from the architecture metadata repository, second architecture metadata representative of the second software system, and displaying, by the support system, at least a portion of the first architecture metadata and at least a portion of the second architecture metadata in a display. Other implementations of this aspect include corresponding systems, apparatus, and computer programs, configured to perform the actions of the methods, encoded on computer storage devices.

These and other implementations can each optionally include one or more of the following features: actions further include determining, by the support system, a log location from the second architecture metadata, and retrieving, by the support system, log data from the log location, the log data representing execution of the second software system, and being used to identify a component of the second software system as a root cause of the incident; the log location includes a database that stores the log data; the first architecture metadata includes RCA metadata for each component of a set of components included in the first software system, the RCA metadata including one or more of log locations and metric types for a respective component; the first architecture metadata includes one or more architecture diagrams graphically depicting an architecture of the first software system, the one or more architecture diagrams being displayed by the support system; the support system is provided by an enterprise that uses the first software system; and the support system is provided by a vendor of the first software system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to root cause analysis (RCA) of issues in software systems. More particularly, implementations of the present disclosure are directed to an RCA platform that enables architecture-based RCA. Implementations can include actions of receiving, by a support system having architecture-based RCA integrated therein, a first identifier associated with an incident arising in a first software system executed within a computing environment, transmitting, by the support system, a first query to an architecture metadata repository, the first query including the first identifier, receiving, by the support system and from the architecture metadata repository, first architecture metadata at least partially including a first architecture graph that is a computer-readable data representation of the first software system and cross-link data representative of one or more dependencies between the first software system and a second software system, transmitting, by the support system, a second query to the architecture metadata repository, the second query including a second identifier assigned to the second software system, the second identifier provided from the cross-link data, receiving, by the support system and from the architecture metadata repository, second architecture metadata representative of the second software system, and displaying, by the support system, at least a portion of the first architecture metadata and at least a portion of the second architecture metadata in a display.

To provide further context for implementations of the present disclosure, enterprises can use software systems to support and execute operations. In many cases, enterprises can use hundreds to thousands of software systems across a landscape. In general, during development of a software system (also referred to as a product herein), architecture diagrams are created and are relevant in describing relationships between components of the software system. However, during subsequent lifecycle phases of the software system (e.g., operations and support), the architecture diagrams are without relevance. More particularly, while information contained in the architecture diagrams may be relevant, the architecture diagrams themselves are not. The lack of relevance in subsequent lifecycle phases, negatively impacts diagram accuracy and devalues the original resources and effort spent in creating the architecture diagrams. Attempts have been made in an effort to enable consistent use of architecture diagrams. For example, while Computer Aided Software Engineering (CASE) tools (from graphic design to generated code) have been developed, such tools have failed to use architecture diagrams consistently during the entire product development. This is due to their lack of flexibility and expensive demand for rigorous design accuracy and detail.

In view of this, implementations of the present disclosure enable increasing the value of the architecture diagrams and broadened use of architecture diagrams in other lifecycle phases of the lifecycle of the developed products. As described in further detail herein, implementations of the present disclosure are particularly relevant in modern development operations (devops) environments, in which operations of the product must not be a decoupled from development of the product.

In order to keep cost low and/or increase efficiency, it is beneficial that first level product support (e.g., help desk) can analyze and resolve incoming problems with a product without having to involve development support (or any next level of support). The latter is more expensive and response/resolution times and complexity increase with each involved party. The same problem rationale applies to administrators within enterprises (e.g., customers that purchase/license and implement software systems) and software vendor support. That is, the more problems the administrator can successfully analyze and resolve on their own, the better it is for both the enterprise and the software vendor, which provided the product. As described in further detail herein, the architecture-based RCA of the present disclosure addresses both of these scenarios.

In further detail, a particular problem for support personnel (e.g., personnel tasked with resolving issues in a product) is the breadth and depth of technical product know-how needed in order to classify incoming incidents and successfully analyze them. More particularly, the product architecture has to be known in order to understand the technical context and potential dependencies between product components and/or other products (i.e., the neighborhood of the occurrence of the incident), and thus to understand whether multiple symptoms of an incident might stem from the same root cause due to the dependencies of the erroneous components. The dependencies between product components are the only physically possible paths between components showing error symptoms and the component being the root cause (i.e., the epicenter of the erroneous product behavior).

Typically, this type of context and dependency information is provided with architecture descriptions. In general, this type of concise, technical information is hard to find in the depths of documentation provided by software vendors. For example, often only so-called "marketecture" rather than architecture is provided (e.g., showing a rough, comprehension-optimized picture, neglecting or simplifying some of the technical reality). Further, these types of documentation are not bound to the incident context (e.g., the component queue to which the incident is assigned to), technical component names, log sources, and the like. The same problem appears when having to interpret and analyze an alert in its context (e.g., by an administrator). Similar to looking only at the support roles, the concept generalizes also the entities incident and alerts and uses only the term incident if not indicated otherwise.

As described in further detail herein, implementations of the present disclosure address, among other problems, the following example problems. A first example problem is that, traditionally, architecture diagrams are only relevant for the design phase of a product, and there is an absence of benefit during the support and operations lifecycle phases (particularly in the context of devops). A second example problem is achieving efficient and effective RCA requires technically correct, and reasonably high-level overview information particularly showing dependencies between products and product components (the neighborhood) in order to better understand the context and the possible paths of error propagation from the root cause. A third example problem arises in that technical overview information for a product is typically hard to find or even not available at all. A fourth example problem is that the RCA-supporting overview and dependency information must be dense, such that it can be consumed with very little time. A fifth example problem is that the RCA-supporting overview and dependency information must be cheap (e.g., in terms of technical resources expended) and simple to create and the creation and consumption process must be robust regarding errors and inconsistencies. A sixth example problem is that RCA also requires navigation from top-level to low-level information and navigating to neighboring components (again from top to bottom).

In view of this, and as described in further detail herein, implementations of the present disclosure provide a platform for architecture-based RCA. As described in further detail herein, the platform for architecture-based RCA provides design-time components and run-time components that enable provision of architecture metadata based on architecture diagrams that represent the architecture of a software system (product). In some implementations, architecture diagrams are collected during the design of the product. During design-time, the design-time components of the platform can link architecture diagrams to one another based on overlapping components (e.g., a component is represented in a first architecture diagram and a second architecture diagram, and the first and second architecture diagrams are linked based on the component). In some examples, the architecture diagrams are augmented with analysis metadata that is relevant to RCA. During design-time, architecture metadata is generated at least partially based on the architecture diagrams and the analysis metadata. During run-time, the architecture metadata (which includes the architecture diagrams) is used through a run-time component in response to an issue arising with the product. In some examples, the architecture metadata is used for support and operations of the product as a result of an incident/problem/alert context-based search or navigation along component dependencies. In some examples, once a component is identified (e.g., through navigation), relevant log entries and metrics associated with dependent components are identified and presented in order to facilitate RCA.

Figure 1:
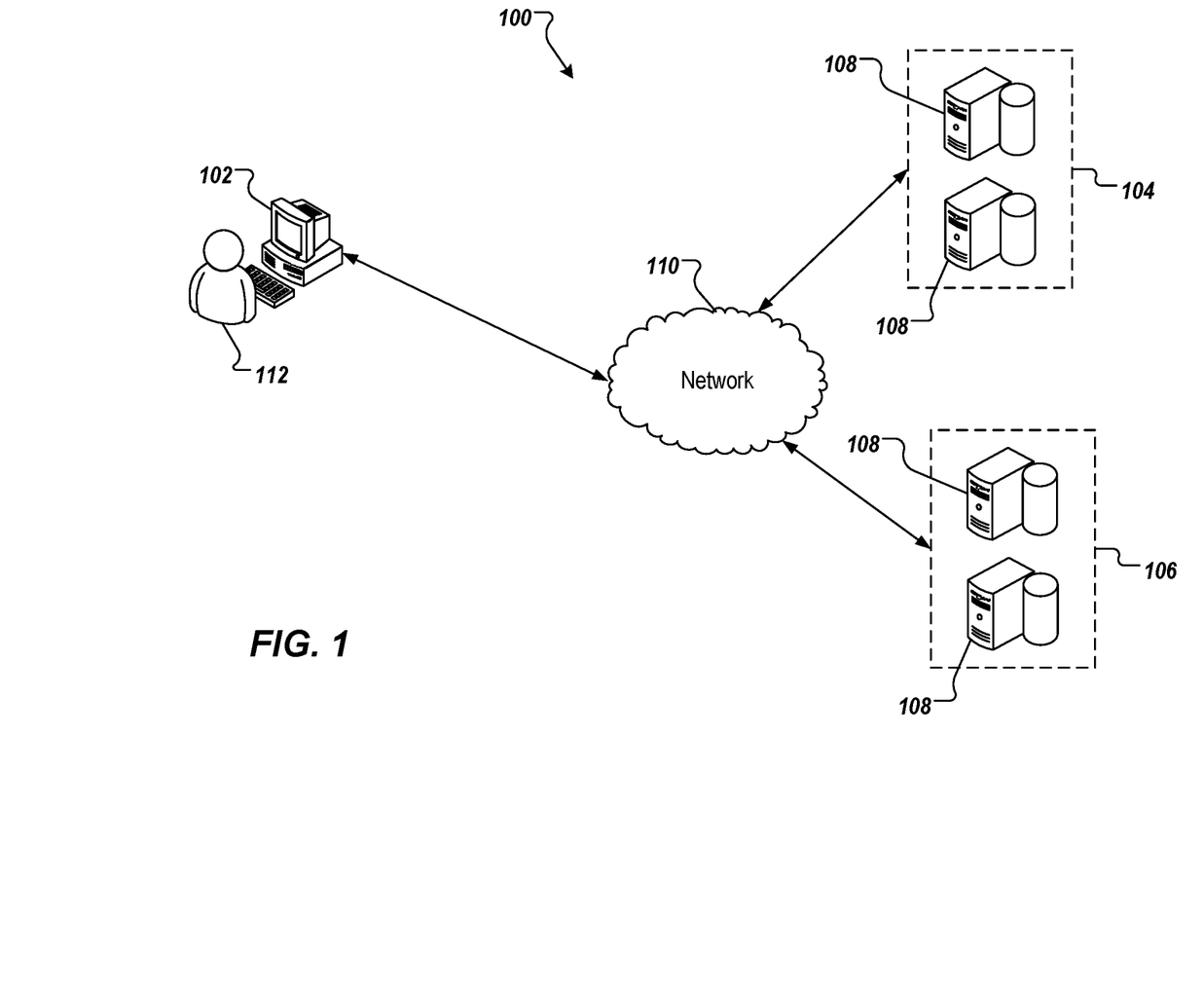
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 110, and server systems 104, 106. The server systems 104, 106 each include one or more server devices and databases 108 (e.g., processors, memory). In the depicted example, a user 112 interacts with the client device 102.

In some examples, the client device 102 can communicate with the server system 104 and/or the server system 106 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 104, 106 includes at least one server and at least one data store. In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a software system (product) that provides functionality in support of operations of an enterprise (customer). For example, the product can be provisioned to the enterprise by a software vendor, which develops the product. In some examples, the server system 106 can host a RCA platform that provides architecture-based RCA in accordance with implementations of the present disclosure. For example, the RCA platform can provide architecture-based RCA for the product that is executed in the software system 104. In some examples, the RCA platform is provisioned at the enterprise that uses the software system (e.g., an administrator employed by the enterprise uses the RCA platform to address issues arising in the software system). In some examples, the RCA platform is provisioned at the software vendor that provisions the software system (e.g., a help desk of the software vendor uses the RCA platform to address issues arising in the software system).

Figure 2:
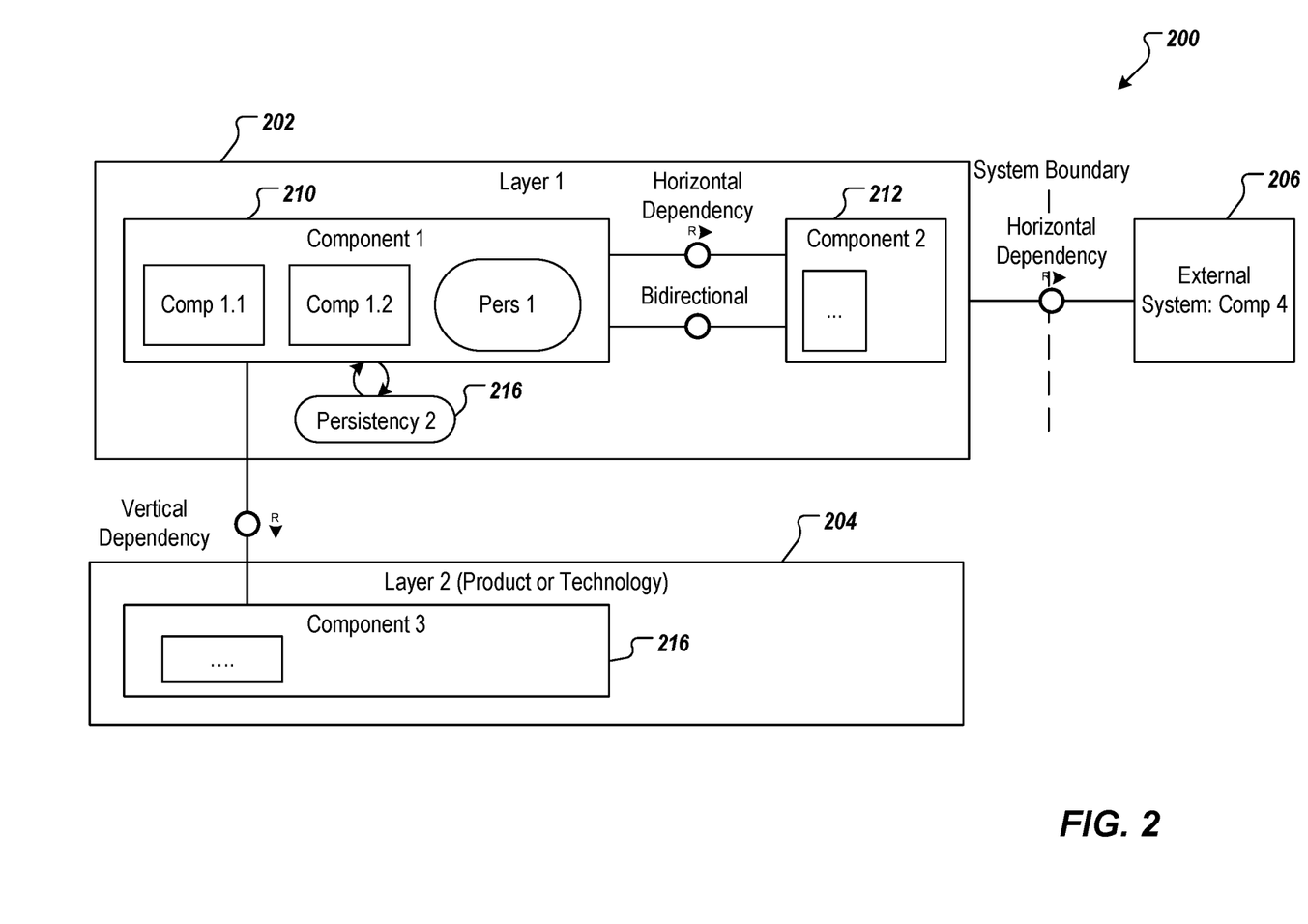
FIG. 2 depicts an example conceptual architecture for software systems.

FIG. 2 depicts an example product architecture 200 for software systems. As depicted in FIG. 2, the product architecture 200 includes a first layer 202, a second layer 204, and a third layer 206 (e.g., a connected system that is external to the product). In the depicted example, the first layer 202 represents a product that has a vertical dependency with the second layer 204, and a horizontal dependency with the third layer 206. In some examples, the first layer 202, the second layer 204, and/or the third layer 206 are included in the same product. In the example of FIG. 2, the first layer 202 includes components 210, 212 and a persistency 216 (data storage). The first component 210 and the second component 212 can each include one or more sub-components and/or one or more persistencies (e.g., the first component 210 includes sub-components Comp 1.1, Comp 1.2, and Pers 1. In the example of FIG. 2, the second layer 204 includes a third component 216, which can include one or more sub-components and/or one or more persistencies. The third layer 206 can also include one or more components (e.g., Comp 4).

In general, product architectures, such as that depicted in FIG. 2, include components and communication channels between the components. Product architectures, such as that depicted in FIG. 2, can be described as the run-time architecture of the product. The overall product architecture can be described with a set of architecture diagrams. Typically, each architecture diagram depicts boxes and lines. Each box represents a product component or functionality and each line represents a communication channel between two components. For example, the line between the first component 210 and the third component 216 in FIG. 2. Other diagram types are possible. For example, the uniform modeling language (UML) is a diagram standard that can be used for creating architecture diagrams.

The example product architecture of FIG. 2 represents a foundation of the architecture-based RCA of the present disclosure and can be applied to any software system (product). A software system is regarded as 3-dimensional space of components and dependencies that describe software layers (from user interface (UI) to persistency), levels of granularity (from subsystems to small components), and software stack layers (from application to operating system (OS)). For example, with component diagrams, the dependencies are expressed as explicit communication channels or by grouping of components into other higher-level components. The diagrams can be connected along these dimensions based on shared components identified by the same (or similar) name. With this model it is possible to holistically and precisely describe an entire software system, which in the end can be the subject of an error analysis (RCA).

In further detail, the dependencies between product components (as defined in the architecture diagram(s)) are the only possible paths between components. These can be used to reflect error symptoms and the component that is the root cause (i.e., the epicenter of the erroneous product behavior). Components that do not share a dependency (directly/first degree or indirectly/second degree) cannot have a common root cause (cause and effect principle). If two components seem to be independent, but appear to still be affected by the same root cause, the dependency knowledge of the two components is just incomplete or not understood well enough.

From a product architecture, architecture metadata can be provided. In some examples, the architecture metadata includes architecture diagrams (e.g., stored in computer-readable files, such as PDF files), an architecture graph (e.g., a machine-readable version of the product architecture), the links to products, cross links to other diagrams through shared components, and RCA metadata (e.g., log locations, metric types, incident queue name (AKH)).

Figure 3:
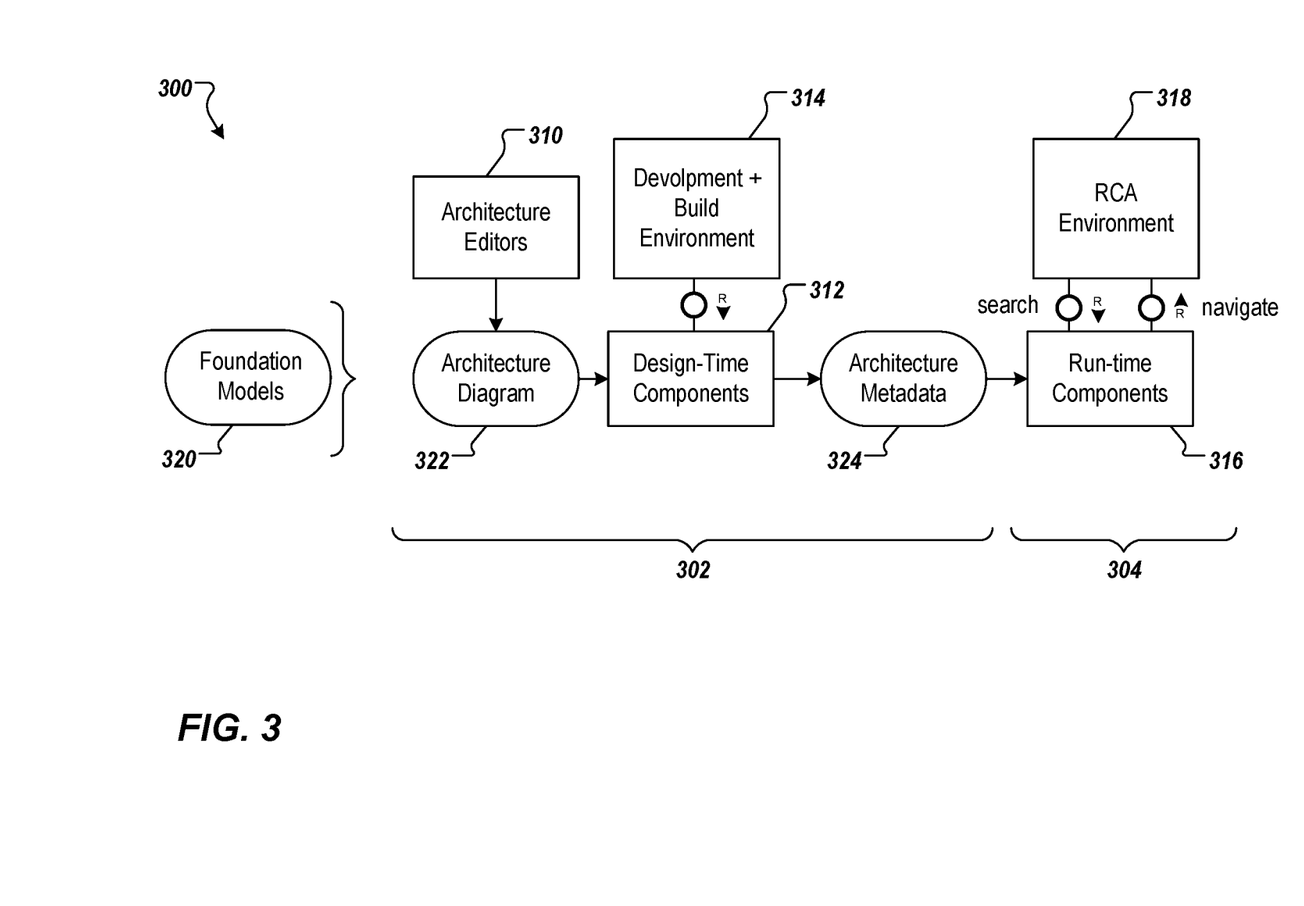
FIG. 3 depicts an example conceptual representation for provisioning architecture-based root cause analysis (RCA) in accordance with implementations of the present disclosure.

FIG. 3 depicts an example conceptual representation 300 for provisioning architecture-based RCA in accordance with implementations of the present disclosure. In the example of FIG. 3, the conceptual representation 300 includes a design-time representation 302, and a run-time representation 304. The design-time representation 302 includes architecture editors 310, design-time components 312, and a development and build environment 314. The run-time environment 304 includes run-time components 316 and an RCA environment 318 (e.g., a support system for addressing issues in software systems). In accordance with implementations of the present disclosure, the design-time representation 302 represents design time activities for development of a product and providing a product architecture (e.g., defined within one or more architecture diagrams), RCA metadata, and a mapping of RCA metadata to architecture diagram(s), as described herein. In some examples, foundation models 320 are the descriptions of the concept of the product architecture (the 3 dimensions), its representation in architecture/UML diagram types, the architecture graph generation rules, the RCA metadata definition, and its detection and mapping rules to the architecture graph. The foundation models 320 are input to the design time and to a minor extent to the run-time modules.

During design-time, the architecture editors are used to generate architecture diagrams 322, as described in further detail herein. The design-time components 312 and the development and build environment 314 process the architecture diagram to provide architecture metadata 324, which includes RCA metadata for the product, among other metadata. For example, the design-time components 312 extend the (existing) development and build environment 314, by receiving the architecture diagrams 322 as input and providing the architecture metadata 324 as output. During run-time (e.g., production use of the software by a customer), the run-time components 316 and the RCA environment 318 can be used to resolve issues by processing the architecture metadata 324 using the architecture-based RCA of the present disclosure.

In some examples the architecture metadata 324 for a product includes an architecture diagram, an architecture graph, link metadata indicating links between the product and one or more other products (also referred to herein as cross-links), and RCA metadata (e.g., log locations, metric types, incident queues). In some examples, the run-time components 316 extend the (existing) RCA environment 318 (e.g., help desks, RCA solutions, monitoring/alerting solutions) using the architecture-based RCA of the present disclosure.

In accordance with implementations of the present disclosure, during design-time (design phase) of a product, the normal project structure and development environment is enhanced, such that architecture diagrams become an integral part of the product project structure. In some examples, the architecture diagrams are provided as product artifacts. In some examples, editors used to create the architecture diagrams are integrated into the design-time environment (e.g., an integrated development environment (IDE)). In some examples, the architecture diagrams represent components and dependencies between components. A dependency can be defined, without limitation, as a data flow between components (e.g., a first component outputs data to a second component, hence a dependency between the first component and the second component). In some examples, the architecture diagram provides a visual representation of the components and dependencies between components within a product.

As described in further detail herein, an architecture graph can be provided, which represents the product in terms of nodes and edges between nodes. For example, a node can represent a part of the product (e.g., component, persistency) and an edge can represent a dependency between parts (e.g., output of a first component flowing as input to a second component). In some examples, the architecture graph is provided as a machine-readable data representation of the components and dependencies between components within a product. For example, the architecture graph can be provided as one or more tables that store data representative of nodes and edges between nodes.

In some implementations, additional metadata is added to the architecture metadata, which can be used for architecture-based RCA during run-time of the product. As one example, product identifiers (e.g., the uniquely identify a product) can be assigned to architecture diagrams. As another example, metadata defining links between architecture diagrams can be added based on respective architecture graphs. For example, a set of architecture graphs can be searched based on a component identifier (e.g., that uniquely identifies the component across multiple architectures) and two or more architecture diagrams that include the component can be identified. In response, link metadata can be added for each of the architecture graphs to digitally represent a link between the architecture graphs (and, thus, the underlying architecture diagrams). As another example, RCA metadata is added for each component. Example RCA metadata can include, without limitation, log locations, metrics and incident queues (e.g., AKH).

During the build and test processes of the product, the metadata from the design-time is checked for existence, correctness and completeness wherever necessary. In some implementations, tools can be provided that alleviate adding the metadata by identifying missing metadata and/or suggesting metadata from code and graph analysis. That is, that the code of the product component is searched for code snippets (this includes also configuration) defining a log location definition or a metric definition. The result is a list of log location and metric definition candidates. This list is compared to already existing, and already existing and node-attached RCA metadata. The new candidates are offered to the developer for assignment to existing or new product components (nodes in the graph). Without this automation, the assignment of RCA metadata is manual task to be carried out by the developer. In both cases, the metadata editor comprised in the design time components 312 is used to create and/or select the metadata and attach it to the corresponding notes of the architecture graph. In some examples, the metadata can be grouped into multiple levels (e.g., 3 levels). The levels represent ascending complexity of required metadata in order to fulfill operations tasks. The design-time tools of the build and test phase are partitioned along the level boundaries. The levels and the tools are described in further detail herein.

In some implementations, the design-time architecture provides for architecture diagram integration to projects. An enhanced project structure and architecture design project perspective enables architecture diagrams to be created directly adjacent to the coding during product development. In some examples, an architecture diagram editor is provided to facilitate creation of architecture diagrams in the design phase. In some examples, a graph creator is provided, which reads an architecture diagram and extracts the components and relationships into one or more architecture graphs representative of the product architecture.

In some examples an architecture graph is generated as follows. The diagram type (e.g., UML component diagram) and technical format (e.g., MS Visio.vsdx format) determines how to read the data technically. The mapping between the diagram shape types and the architecture graph determines how the different diagram elements have to be translated to the architecture graph. For a component diagram, the box shapes are translated to nodes, lines between the boxes are translated to graph edges (communication edges). Containment of boxes are translated to edges (containment edges). Other shapes are ignored. The user is able to adjust the results of the created graph to clarify any misinterpreted ambiguities. The manual additions and changes are recorded such that the creation is repeatable (e.g., on updates of the graph due to a new component and thus product version).

In some examples, the architecture graphs are used for adding component-specific metadata for subsequent RCA, as described herein. In some examples, the graph creator also provides a pdf file of the source architecture diagram for keeping and providing the already laid-out, visual representation of the product architecture, In some implementations, the design-time architecture includes a product analyzer that provides level 1 metadata support. For example, the product analyzer enables verification that each architecture file and the corresponding graph(s) are associated with a product. For example, the product analyzer identifies, the product ID that uniquely identifies the product, and stores the association in a metadata file. In some examples, level 1 metadata is used for searching the context of a component or product under analysis. Example level 1 metadata can include, without limitation, the product association, and the architecture graph.

In some implementations, the design-time architecture includes a diagram analyzer that provides level 2 metadata support. For example, the diagram analyzer creates a diagram metadata file that matches the components from two diagrams in order to link the diagrams along the product model dimensions for navigation along component dependencies. Possible matches are suggested based on name identity or name proximity (within a product automatically and across products on selection by the user). For example, and as described above, a set of architecture graphs can be searched based on a component ID, two or more architecture diagrams that include the component can be identified, and in response, link metadata can be added for each of the architecture graphs to digitally represent a link between the architecture graphs (and, thus, the underlying architecture diagrams).

In some implementations, the design-time architecture includes a code analyzer that provides level 3 metadata support. For example, the code analyzer creates a diagram metadata file (storing RCA metadata) that augments the components with their log locations, metric types and incident queues in order to provide access to analysis data for components that are navigation targets. Log locations and metric types are retrieved from real test systems and suggested to the user. Retrieval of metrics (exact metric types) and log locations from test systems avoids having to scan the entire product code. Instead, the available monitoring tools and log viewers have a configuration that allows for listing the entirety of all metric types and log locations. In this manner, only the configuration must be scanned rather than the entire product code. Incident queues can be suggested based on proximity between component and product names and incident queue metadata.

Figure 4:
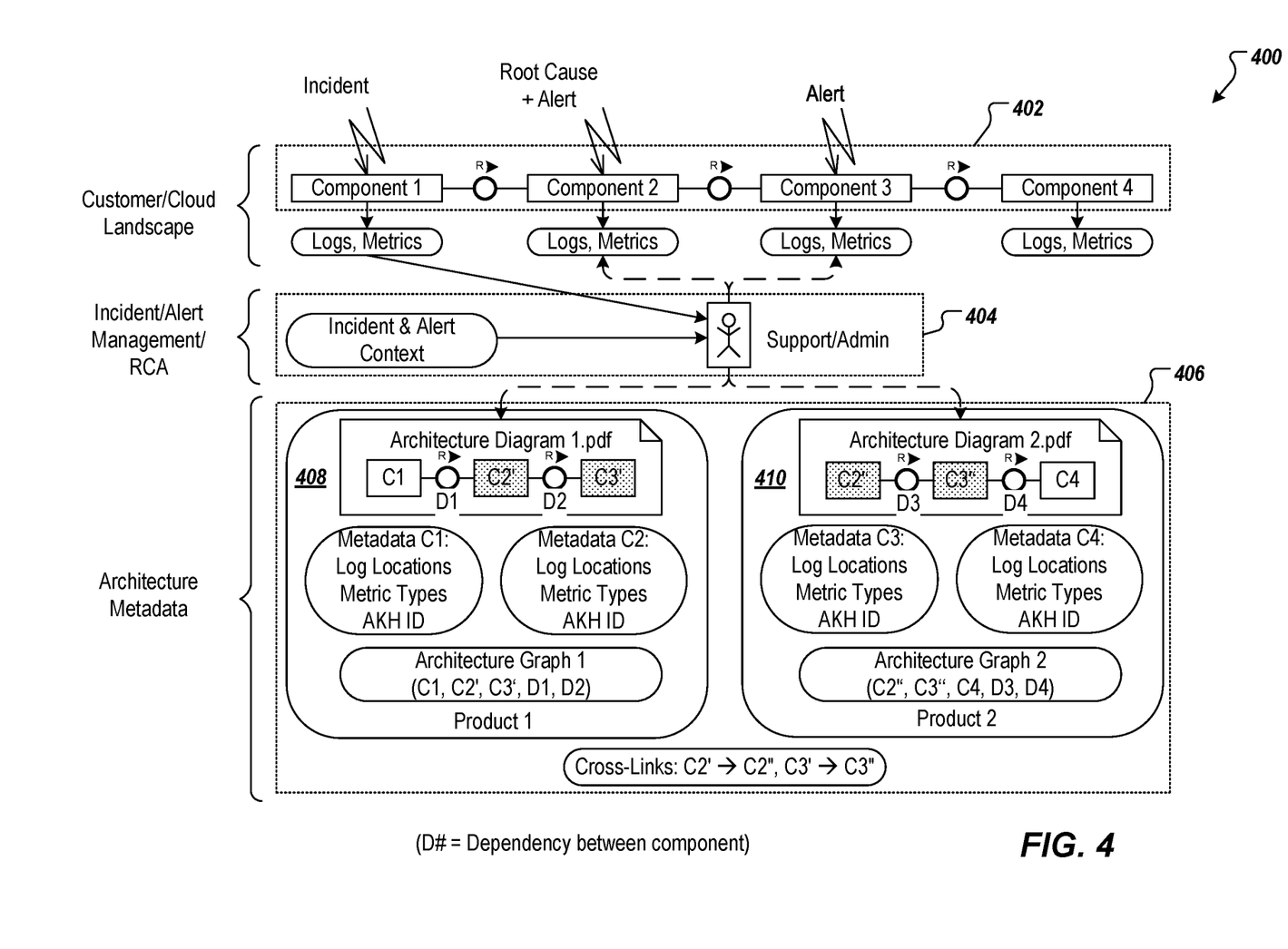
FIG. 4 depicts a conceptual overview of architecture-based RCA in accordance with implementations of the present disclosure.

FIG. 4 depicts a conceptual overview 400 of architecture-based RCA in accordance with implementations of the present disclosure. More particularly, the conceptual overview 400 represents architecture-based RCA during runtime of a product. In the example of FIG. 4, the conceptual overview 400 includes a computing environment 402 (e.g., cloud-computing environment), within which multiple products can be executed, a RCA environment 404 for resolving any issues raised through execution of a product within the computing environment, and an architecture metadata store 406. In some examples, the architecture metadata store 406 stores architecture metadata for one or more products executed within the computing environment 402. In the depicted example, the architecture metadata store 406 stores architecture metadata 408, 410 for respective products (e.g., Product 1, Product 2, respectively).

In accordance with implementations of the present disclosure, the RCA environment 404 can selectively access architecture metadata in the architecture metadata store 406. For example, an issue (also referred to herein as incident) can arise in execution of a component of a product within the computing environment 402. In some examples, the issue results in a notification being provided to the RCA environment 404 and can indicate a component ID and/or a product ID, from which the issue arose. In some examples, although an issue arises from a component, that component is not always the root cause of the issue.

In some implementations, the architecture metadata store 406 can be queried by the RCA environment 404 to return architecture metadata. For example, a query can be issued to the architecture metadata store 406, the query including the component ID and/or the product ID associated with the issue within the computing environment 402. In response to the query, architecture metadata is returned to the RCA environment 404. In some examples, the architecture metadata corresponds to the product, from which the issue arose, and one or more other products. For example, architecture metadata for a product that is linked to the product, within which the issue arose, can also be returned.

In the example of FIG. 4, architecture metadata 406 (representative of Product 1) and architecture metadata 408 (representative of Product 2) are returned to the RCA environment 404. For example, an incident can arise within Component 1 (C1) of Product 1. Consequently, the architecture metadata 406 is returned in response to a query indicating C1 and/or Product 1. In the example of FIG. 4, it can be determined that a link exists between Product 1 and Product 2 from cross-link data that is also stored in the architecture metadata store 406 (e.g., C2' of Product 1 corresponds to C2" of Product 2; C3' of Product 1 corresponds to C3" of Product 2). In the example of FIG. 4, the architecture metadata 406 includes an architecture diagram depicting dependencies (D) between components of Product 1, an architecture graph providing a data representation of the components and dependencies of Product 1, and RCA metadata for one or more components (e.g., RCA metadata for C1 and C2 (C2' being an instantiation of C2 in the computing environment 402)). In the example of FIG. 4, the architecture metadata 408 includes an architecture diagram depicting dependencies (D) between components of Product 2, an architecture graph providing a data representation of the components and dependencies of Product 2, and RCA metadata for one or more components (e.g., RCA metadata for C3 and C4).

In further detail, and as introduced above, during runtime, an issue with a component can result in an incident appearing in the support system (e.g., at the inbox of a help desk, or an administrator). In some examples, the support system can include the RCA environment 404 of FIG. 4. As also introduced above, architecture metadata is retrieved in response to the incident. As noted above, the architecture metadata can be described in terms of levels (e.g., level 1 (list of architecture diagrams and graphs for one product), level 2 (linked diagrams and graphs), level 3 (graphs annotated with component metadata)), and example usage of the architecture metadata is described in the following.

In some examples, level 1 architecture metadata can include architecture diagrams. For example, based on incident context or contextual knowledge of the incident, the support role (e.g., administrator) identifies the product identifier or affected component identifier. The identifier is entered into architecture context search of the RCA environment 404 to query the architecture metadata store 406 for matching architecture diagrams. For examples, the architectural graph can be queried based on the identifier and the product association for proximity matches. The matching architecture diagrams are presented for selection and are depicted upon selection (e.g., within the RCA environment 404). In some examples, level 2 architecture metadata can include cross-link metadata. For example, during the analysis the support role (e.g., administrator) can search for connected architecture diagrams by either specifying a component identifier or by requesting all linked diagrams. Again, the selected diagrams are displayed. In some examples, level 3 architecture metadata can include RCA metadata. For example, by specifying a component identifier, the support role can receive a list of RCA metadata. By selected metric types or log locations entries from the list, UI links to the corresponding log viewer or monitoring application are presented. For example, a central monitoring and log viewer is implemented, such that metric types and log locations are used as filters to these applications.

In some instances, a problem can occur that a navigation target (e.g., a component of a product) cannot be derived solely from the architecture metadata. This can occur when, for example, the component of interest exists with multiple instances in a landscape (e.g., in the computing environment 402). To address this, the address data of the available instances of the component is provided from a landscape directory that stores the address information (e.g., address of a server, on which the instance of the component that the issue arose from is executing).

In some implementations, the run-time architecture (e.g., such as that depicted in FIG. 4) includes an architecture metadata repository (e.g., the architecture metadata store 406 of FIG. 4), which stores architecture diagrams, architecture graphs, cross-link metadata, and RCA metadata. In some examples, the architecture metadata repository is built on a database that stores relational data (e.g., in tables) and binaries (e.g., PDF files), stores and processes architecture graphs, and supports searching (querying) with (fuzzy) text input (e.g., product identifier, component identifier). In some examples, the architecture metadata repository exposes a search application programming interface (API), through which queries can be submitted.

In some examples, a first level of support through the RCA environment includes providing an architecture search UI for product and components integrated into (or accessible by link) from the analysis tool (e.g., help desk, monitoring tool). In some examples, the RCA environment accesses the search API of the architecture metadata repository in order to retrieve architecture metadata (e.g., for level 1, a list of architecture diagrams) and returns the data to an architecture diagram viewer of the RCA environment. The architecture diagram viewer fetches architecture diagrams from the architecture metadata repository and displays them to the user.

In some examples, a second level of support through the RCA environment includes diagram navigation. For example, the RCA environment includes a diagram navigator (e.g., as an additional pane in the architecture diagram viewer) that exposes the corresponding architecture graph of the architecture diagram. In some examples, the diagram navigator enables selection of nodes/edges identified from the diagram that are then handed over to the search UI, which can submit the selected nodes/edges as a search query to the architecture metadata repository, and a list of architecture diagrams can be displayed. In some examples, a third level of support can include analysis navigation. For example, an analysis navigator (e.g., as an additional pane in the architecture diagram viewer) that shows the RCA metadata that is associated with a specific component (e.g., a node of the architecture graph).

Figure 5A:
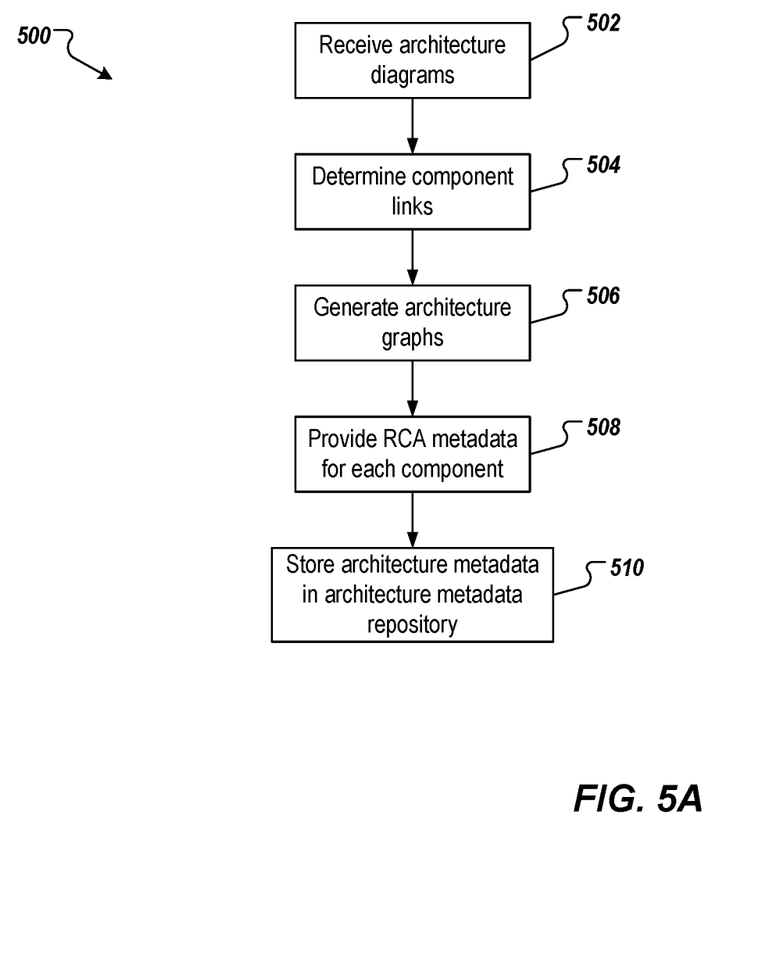
FIGS. 5A-5B depict example processes that can be executed in accordance with implementations of the present disclosure.

FIG. 5A depicts an example process 500 that can be executed in accordance with implementations of the present disclosure. In some examples, the example process 500 is provided using one or more computer-executable programs executed by one or more computing devices. The example process 500 can be executed for design-time enablement of architecture-based RCA in accordance with implementations of the present disclosure.

Architecture diagrams are received (502). For example, the design-time components 312 of FIG. 3 receive the architecture diagrams 322 that graphically represent a product and that are generated using the architecture editors 310. In some examples, and as described herein, the architecture diagrams are provided in parallel with development of the product (e.g., using the development and build environment 314) and depict components and dependencies between components. In some examples, component IDs are provided (e.g., that uniquely identify respective components across two or more products) and a product ID is provided (e.g., that uniquely identifies the product across multiple products).

Components and their links are determined (504). For example, and as described herein, for each component ID, a search can be executed to identify architecture diagrams, and thus products (by product IDs) that the component having the component ID is included in. If the component is in multiple products, cross-link data can be provided representing a link between components across products (e.g., C2' of Product 1 corresponds to C2" of Product 2; C3' of Product 1 corresponds to C3" of Product 2, as depicted in FIG. 4). Architecture graphs are generated (506). For example, and as described herein, a graph creator receives an architecture as input and provides an architecture graph as output. Each architecture graph is provided as a machine-readable data representation of the components and dependencies between components within a product. For example, the architecture graph can be provided as one or more tables that store data representative of nodes and edges between nodes, where nodes represent components and edges represent dependencies between components. RCA metadata is provided for each component (508). For example, and as described herein, for each component, log locations, metrics and/or incident queues are identified and are linked to the component within the RCA metadata. Architecture metadata is stored in an architecture metadata repository (510). For example, the architecture metadata is stored in an architecture metadata repository (e.g., the architecture metadata repository 406 of FIG. 4). In some examples, the architecture metadata is indexed within the architecture metadata repository based on component IDs and/or product ID. For example, each component represented in the architecture metadata is included in an index to enable retrieval of the architecture metadata during run-time. In this manner, a support system that implements the architecture-based RCA of the present disclosure (e.g., the RCA environment 404 of FIG. 4) can search the architecture metadata repository to retrieve architecture metadata during run-time.

Figure 5B:
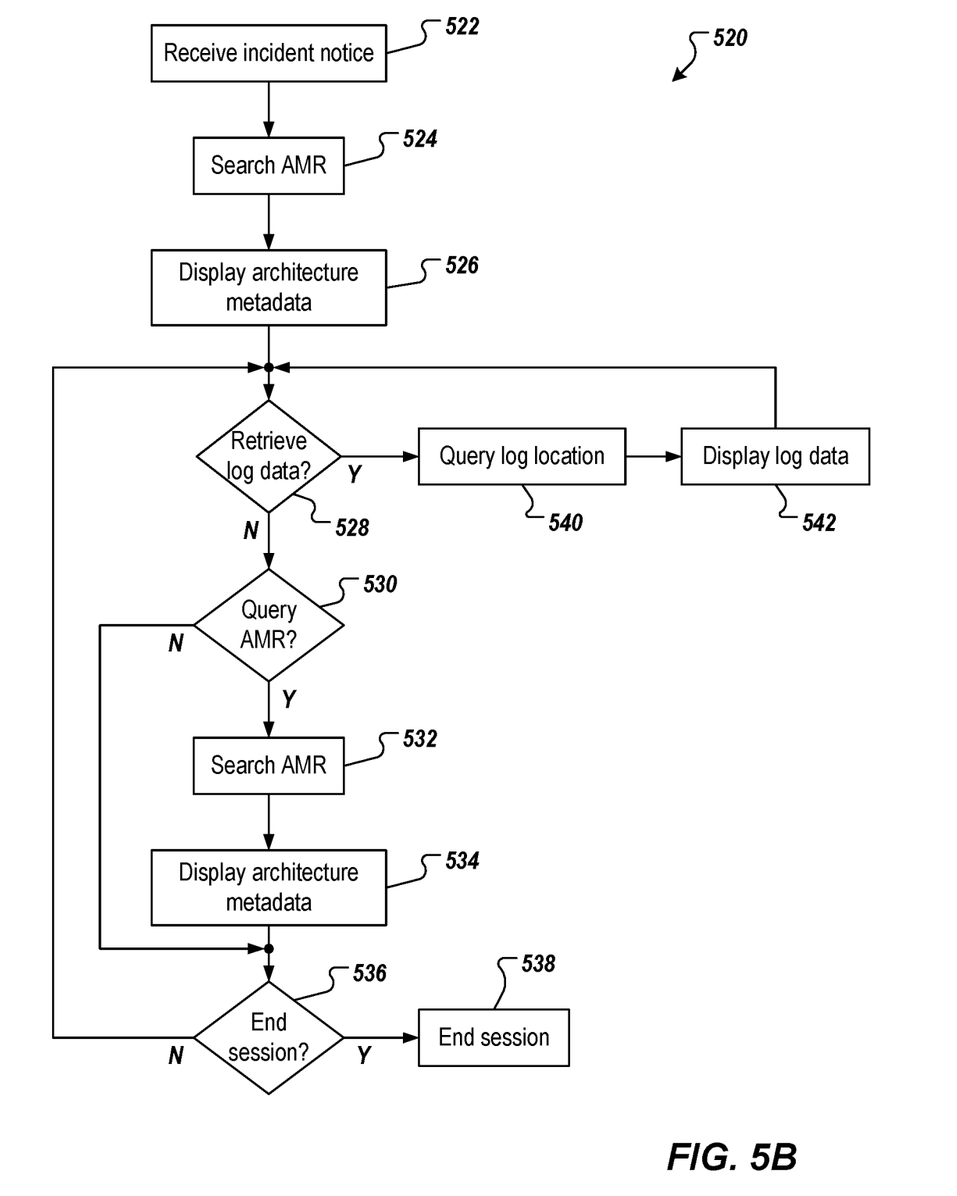

FIG. 5B depicts an example process 520 that can be executed in accordance with implementations of the present disclosure. In some examples, the example process 520 is provided using one or more computer-executable programs executed by one or more computing devices. The example process 520 can be executed for run-time architecture-based RCA in accordance with implementations of the present disclosure.

An incident notice is received (522). For example, a support system that has an architecture-based RCA integrated therein (e.g., the RCA environment 404 of FIG. 4) can receive the incident notice and begin a support session for resolution of the incident. In some examples, the incident notice is automatically issued by a computing system, within which a software system executes, in response to an issue with the software system. In some examples, the incident notice includes one or more identifiers. For example, the incident notice can include a component ID and/or a product ID to identify a component and/or product, respectively, that has an issue.

An architecture metadata repository (AMR) is searched (524). For example, the RCA environment 404 can query the architecture metadata repository 406 based on the identifier provided with the incident notice, and, in response to the query, the architecture metadata repository 406 can return architecture metadata (e.g., architecture metadata associated with the component/product associated with the identifier). Architecture metadata is displayed (526). For example, at least a portion of the architecture metadata returned from the architecture metadata repository is displayed (e.g., an architecture diagram, an architecture graph, cross-link data, and/or RCA metadata are displayed).

It is determined whether log data is to be retrieved (528). For example, it can be determined whether input has been received to the support system requesting retrieval of log data. If log data is not to be retrieved, it is determined whether the architecture metadata repository is to be searched (530). If the architecture metadata repository is to be searched, the architecture metadata repository is searched (532) and architecture metadata is displayed (534). For example, it can be determined whether input has been received to the support system requesting retrieval of (additional) architecture metadata. In some examples, and as described herein, cross-link data (e.g., identifiers of components of another software system that are cross-linked with the software system, from which the incident arose) can be provided as architecture metadata and can be used to query the architecture metadata repository. In some examples, a query to the architecture metadata includes a component ID, which enables the architecture metadata repository to determine architecture metadata that is to be returned in response to the query.

It is determined whether the session is to end (536). For example, it can be determined whether input has been received to the support system indicating that the session is to end. In some examples, the input can be provided by a user (e.g., administrator) after determining that the incident has been resolved. If it is determined that the session is to end, the session is ended (538). If it is determined that the session is not to end, the example process 520 loops back. If log data is to be retrieved, a log location is queried (540), log data is displayed (542), and the example process 520 loops back. In some examples, and as described herein, a log location (e.g., a database) for a component can be provided as architecture metadata. A query can be issued to the log location requesting log data for the component. In some examples, the query includes a component ID, which enables the log location to determine log data that is to be returned in response to the query.

In general, the process 520 depicts how log locations of the RCA metadata present in the architecture graph stored in the AMR are used. The process follows essentially the same steps when accessing metrics. Another metric process branch is added (like Retrieve log data 528→Query log location 540→Display log data 542 there is Retrieve metric definitions from AMR, query metrics, display metrics). Yet another and third branch is the decision to forward the incident notice to another incident queue that can better resolve the incident: Query AKH names of components in a diagram→select AKH name of component in question→forward ticket notice to incident queue identified by AKH name).

Figure 6:
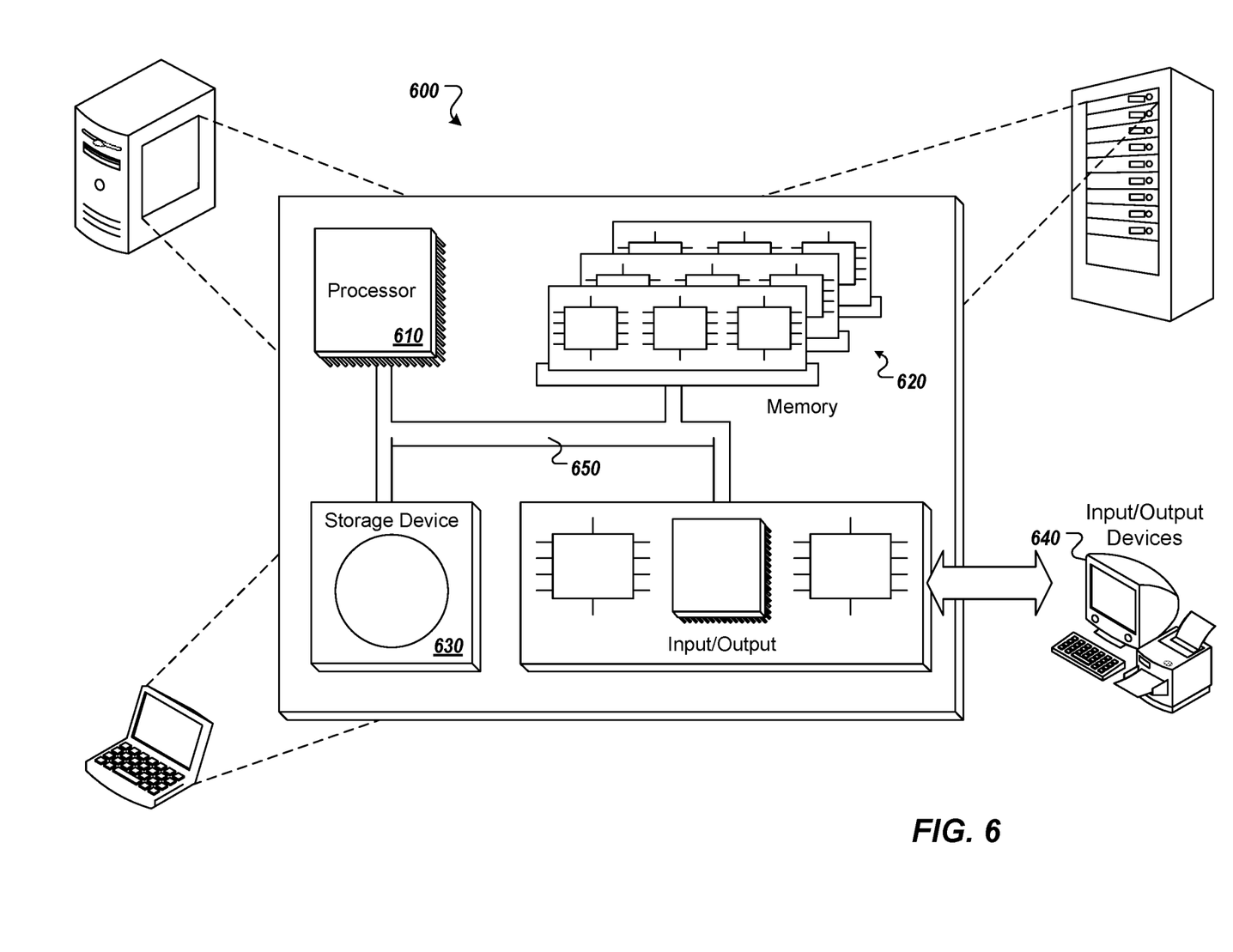
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for architecture-based root cause analysis (RCA) in software systems, the method being executed by one or more processors and comprising:
    receiving, by a support system having architecture-based RCA integrated therein, a first identifier associated with an incident arising in a first software system executed within a computing environment;
    transmitting, by the support system, a first query to an architecture metadata repository, the first query comprising the first identifier;
    receiving, by the support system and from the architecture metadata repository, first architecture metadata at least partially comprising a first architecture graph that is a computer-readable data representation of the first software system and cross-link data representative of one or more dependencies between the first software system and a second software system;
    transmitting, by the support system, a second query to the architecture metadata repository, the second query comprising a second identifier assigned to the second software system, the second identifier provided from the cross-link data;
    receiving, by the support system and from the architecture metadata repository, second architecture metadata representative of the second software system; and
    displaying, by the support system, at least a portion of the first architecture metadata and at least a portion of the second architecture metadata in a display.

2. The method of claim 1, further comprising:
    determining, by the support system, a log location from the second architecture metadata; and
    retrieving, by the support system, log data from the log location, the log data representing execution of the second software system, and being used to identify a component of the second software system as a root cause of the incident.

3. The method of claim 1, wherein the log location comprises a database that stores the log data.

4. The method of claim 1, wherein the first architecture metadata comprises RCA metadata for each component of a set of components included in the first software system, the RCA metadata comprising one or more of log locations and metric types for a respective component.

5. The method of claim 1, wherein the first architecture metadata comprises one or more architecture diagrams graphically depicting an architecture of the first software system, the one or more architecture diagrams being displayed by the support system.

6. The method of claim 1, wherein the support system is provided by an enterprise that uses the first software system.

7. The method of claim 1, wherein the support system is provided by a vendor of the first software system.

8. A non-transitory computer-readable storage medium coupled to one or more processors and having instructions stored thereon which, when executed by the one or more processors, cause the one or more processors to perform operations for architecture-based root cause analysis (RCA) in software systems, the operations comprising:
  receiving, by a support system having architecture-based RCA integrated therein, a first identifier associated with an incident arising in a first software system executed within a computing environment;
  transmitting, by the support system, a first query to an architecture metadata repository, the first query comprising the first identifier;
  receiving, by the support system and from the architecture metadata repository, first architecture metadata at least partially comprising a first architecture graph that is a computer-readable data representation of the first software system and cross-link data representative of one or more dependencies between the first software system and a second software system;
  transmitting, by the support system, a second query to the architecture metadata repository, the second query comprising a second identifier assigned to the second software system, the second identifier provided from the cross-link data;
  receiving, by the support system and from the architecture metadata repository, second architecture metadata representative of the second software system; and
  displaying, by the support system, at least a portion of the first architecture metadata and at least a portion of the second architecture metadata in a display.

9. The computer-readable storage medium of claim 8, wherein operations further comprise:
  determining, by the support system, a log location from the second architecture metadata; and
  retrieving, by the support system, log data from the log location, the log data representing execution of the second software system, and being used to identify a component of the second software system as a root cause of the incident.

10. The computer-readable storage medium of claim 8, wherein the log location comprises a database that stores the log data.

11. The computer-readable storage medium of claim 8, wherein the first architecture metadata comprises RCA metadata for each component of a set of components included in the first software system, the RCA metadata comprising one or more of log locations and metric types for a respective component.

12. The computer-readable storage medium of claim 8, wherein the first architecture metadata comprises one or more architecture diagrams graphically depicting an architecture of the first software system, the one or more architecture diagrams being displayed by the support system.

13. The computer-readable storage medium of claim 8, wherein the support system is provided by an enterprise that uses the first software system.

14. The computer-readable storage medium of claim 8, wherein the support system is provided by a vendor of the first software system.

15. A system, comprising:
  a computing device; and
  a computer-readable storage device coupled to the computing device and having instructions stored thereon which, when executed by the computing device, cause the computing device to perform operations for architecture-based root cause analysis (RCA) in software systems, the operations comprising:
    receiving, by a support system having architecture-based RCA integrated therein, a first identifier associated with an incident arising in a first software system executed within a computing environment;
    transmitting, by the support system, a first query to an architecture metadata repository, the first query comprising the first identifier;
    receiving, by the support system and from the architecture metadata repository, first architecture metadata at least partially comprising a first architecture graph that is a computer-readable data representation of the first software system and cross-link data representative of one or more dependencies between the first software system and a second software system;
    transmitting, by the support system, a second query to the architecture metadata repository, the second query comprising a second identifier assigned to the second software system, the second identifier provided from the cross-link data;
    receiving, by the support system and from the architecture metadata repository, second architecture metadata representative of the second software system; and
    displaying, by the support system, at least a portion of the first architecture metadata and at least a portion of the second architecture metadata in a display.

16. The system of claim 15, wherein operations further comprise:
  determining, by the support system, a log location from the second architecture metadata; and
  retrieving, by the support system, log data from the log location, the log data representing execution of the second software system, and being used to identify a component of the second software system as a root cause of the incident.

17. The system of claim 15, wherein the log location comprises a database that stores the log data.

18. The system of claim 15, wherein the first architecture metadata comprises RCA metadata for each component of a set of components included in the first software system, the RCA metadata comprising one or more of log locations and metric types for a respective component.

19. The system of claim 15, wherein the first architecture metadata comprises one or more architecture diagrams graphically depicting an architecture of the first software system, the one or more architecture diagrams being displayed by the support system.

20. The system of claim 15, wherein the support system is provided by an enterprise that uses the first software system.

* * * * *